(12) United States Patent
Flachs et al.

(10) Patent No.: US 6,598,153 B1
(45) Date of Patent: Jul. 22, 2003

(54) PROCESSOR AND METHOD THAT ACCELERATE EVALUATION OF PAIRS OF CONDITION-SETTING AND BRANCH INSTRUCTIONS

(75) Inventors: Brian King Flachs, Georgetown, TX (US); Harm Peter Hofstee, Austin, TX (US); Kevin John Nowka, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/458,407

(22) Filed: Dec. 10, 1999

(51) Int. Cl.⁷ ................................................. G06F 9/38
(52) U.S. Cl. ...................... 712/234; 712/215; 712/219
(58) Field of Search ................................. 712/215, 218, 712/219, 234, 236

(56) References Cited

U.S. PATENT DOCUMENTS

| | | | | |
|---|---|---|---|---|
| 4,589,065 A | * | 5/1986 | Auslander et al. | 714/35 |
| 4,594,655 A | * | 6/1986 | Hao et al. | 712/218 |
| 4,924,422 A | | 5/1990 | Vassiliadis et al. | |
| 4,947,359 A | | 8/1990 | Vassiliadis et al. | |
| 4,947,369 A | * | 8/1990 | Thoma et al. | 712/234 |
| 5,519,649 A | * | 5/1996 | Takahashi | 708/525 |
| 5,588,127 A | * | 12/1996 | Bosshart | 712/200 |
| 5,652,910 A | * | 7/1997 | Boutaud | 712/218 |
| 5,805,876 A | * | 9/1998 | Bose et al. | 712/234 |
| 6,035,390 A | | 3/2000 | Burns et al. | |
| 6,237,085 B1 | | 5/2001 | Burns et al. | |

FOREIGN PATENT DOCUMENTS

| | | |
|---|---|---|
| JP | 1309129 A | 12/1989 |
| JP | 4218834 A | 8/1992 |
| JP | 8-007083 A | 1/1996 |
| JP | 9-28564 A | 11/1997 |

OTHER PUBLICATIONS

Phillips et al., "High–Performance 3–1 Interlock Collapsing ALU's", *IEEE Transactions on Computers*, vol. 43, iss. 3, pp. 257–268, Mar. 1994.*
H. Sachar, "Fast Resolution of Condition Code for Logical Operations," IBM Technical Disclosure Bulletin, vol. 23, No. 4, Sep. 1990, pp. 1725–1726.

* cited by examiner

*Primary Examiner*—William M. Treat
(74) *Attorney, Agent, or Firm*—Casimer K. Salys; Bracewell & Patterson, L.L.P.

(57) ABSTRACT

A processor that promotes accelerated resolution of conditional branch instructions includes an instruction sequencer that fetches a plurality of instructions and a detector that detects, among the plurality of fetched instructions, a condition-setting instruction and a conditional branch instruction that depends upon the condition-setting instruction. The processor further includes a decoder that decodes the conditional branch instruction to produce a decoded condition type and an execution unit. In response to the detection of the condition-setting instruction and the conditional branch instruction, the execution unit resolves the conditional branch instruction by evaluating the condition-setting instruction and the decoded condition type in a single operation. Because the condition code bits are not computed or stored as an intermediate result as in prior art processors, branch resolution is accelerated.

17 Claims, 5 Drawing Sheets

PROCESSOR AND METHOD THAT ACCELERATE EVALUATION OF PAIRS OF CONDITION-SETTING AND BRANCH INSTRUCTIONS

CROSS-REFERENCE TO RELATED APPLICATIONS

This application is related to the following applications, which are assigned to the assignee of this application and are incorporated herein by reference:

(1) U.S. application Ser. No. 09/005,471, entitled "Method and Apparatus for Generating Less Than (LT), Greater Than (GT), and Equal To (EQ) Condition Code Bits Concurrent with an Arithmetic or Logical Operation" and filed on Jan. 12, 1998, now U.S. Pat. No. 6,035,390; and (2) U.S. application Ser. No. 09/207,482, entitled "Processor and Method for Generating Less Than (LT), Greater Than (GT), and Equal To (EQ) Condition Code Bits Concurrent with a Logical or Complex Operation" and filed Dec. 8, 1998, now U.S. Pat. No. 6,237,085.

BACKGROUND OF THE INVENTION

1. Technical Field

The present invention relates in general to a method and system for data processing and, in particular, to a processor and method for processing branch instructions. Still more particularly, the present invention relates to a processor and method that accelerate the resolution of conditional branch instructions.

2. Description of the Related Art

Branch instructions within a processor's instruction set architecture (ISA) can generally be classified as either conditional or unconditional branch instructions. When executed, unconditional branch instructions always change the flow of program execution from a sequential execution path to a specified target execution path. Thus, the execution of unconditional branch instructions does not depend upon a condition supplied by the occurrence of an event. In contrast, conditional branch instructions may or may not change program flow depending upon a specified condition within the processor, for example, the state of specified condition register bits (e.g., greater than (GT), less than (LT), and equal to (EQ)) or the value of a counter.

Conventional processors generally adopt one of two strategies for processing conditional branch instructions. First, a conventional processor can operate without branch prediction, meaning that the processor does not execute instructions following a conditional branch instruction until the condition upon which the branch depends is known. In cases in which the condition is not available (i.e., the branch is not resolved) prior to processing of the conditional branch instruction, execution of instructions following the conditional branch instruction is stalled until the condition becomes available. Because this delay can be viewed as undesirable from a performance standpoint, other processors predict the outcome of conditional branch instructions. Techniques utilized to predict conditional branch instructions vary in complexity from relatively simple static (i.e., compiler-driven) prediction mechanisms to complex dynamic prediction mechanisms that utilize a branch history table (BHT) containing one or more levels of branch history to provide branch direction predictions (e.g., taken or not taken) and a branch target address cache (BTAC) to provide the target address of the predicted path. The predicted path is then executed speculatively until the condition upon which the branch depends is known, and the branch prediction can be resolved as correctly predicted or mispredicted. In the event that the conditional branch instruction was correctly predicted, the speculation results in a performance benefit. However, in the event of a misprediction, the speculatively executed instructions and the associated results must be flushed and instructions within the correct path must be fetched and executed. The cycles consumed by redirecting execution from the mispredicted path to the correct path is known as a branch misprediction penalty.

Regardless of which of the these (or other) approaches to processing conditional branch instructions is adopted, it is advantageous to resolve conditional branch instructions as quickly as possible to minimize execution stalls in processors that do not utilize branch prediction or to minimize branch misprediction penalties in processors that employ branch prediction. To resolve a conditional branch instruction, conventional processors first determine the result of a condition-setting instruction (e.g., a compare instruction or a recording form of an arithmetic instruction) and utilize the result of the instruction to produce the condition register bits in subsequent cycle(s). Bits from the branch instruction that specify the condition upon which the branch depends are thereafter evaluated with respect to the condition register bits to determine if the branch should be taken or not taken. Thus, in conventional processors, conditional branch instructions are resolved by performing a three step serial process.

Recently, various techniques have been developed in order to determine the value of the one or more condition register bits in parallel with the execution of certain types of instructions. Examples of such approaches are disclosed by Burns et al. in the applications incorporated by reference above. Although the early determination of the value of one or more condition register bits provides some performance advantages over the conventional approach, there remains a need in the art for a method and apparatus to accelerate the resolution of a conditional branch instruction as taken or not taken.

SUMMARY OF THE INVENTION

In order to accelerate the resolution of conditional branch instructions, the present invention provides a processor including an instruction sequencer that fetches a plurality of instructions and a detector that detects, among the plurality of fetched instructions, a condition-setting instruction and a conditional branch instruction that depends upon the condition-setting instruction. The processor further includes a decoder that decodes the conditional branch instruction to produce a decoded condition type and an execution unit. In response to the detection of the condition-setting instruction and the conditional branch instruction, the execution unit resolves the conditional branch instruction by evaluating the condition-setting instruction and the decoded condition type in a single operation. Because the condition code bits are not computed or stored as an intermediate result as in prior art processors, branch resolution is accelerated.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
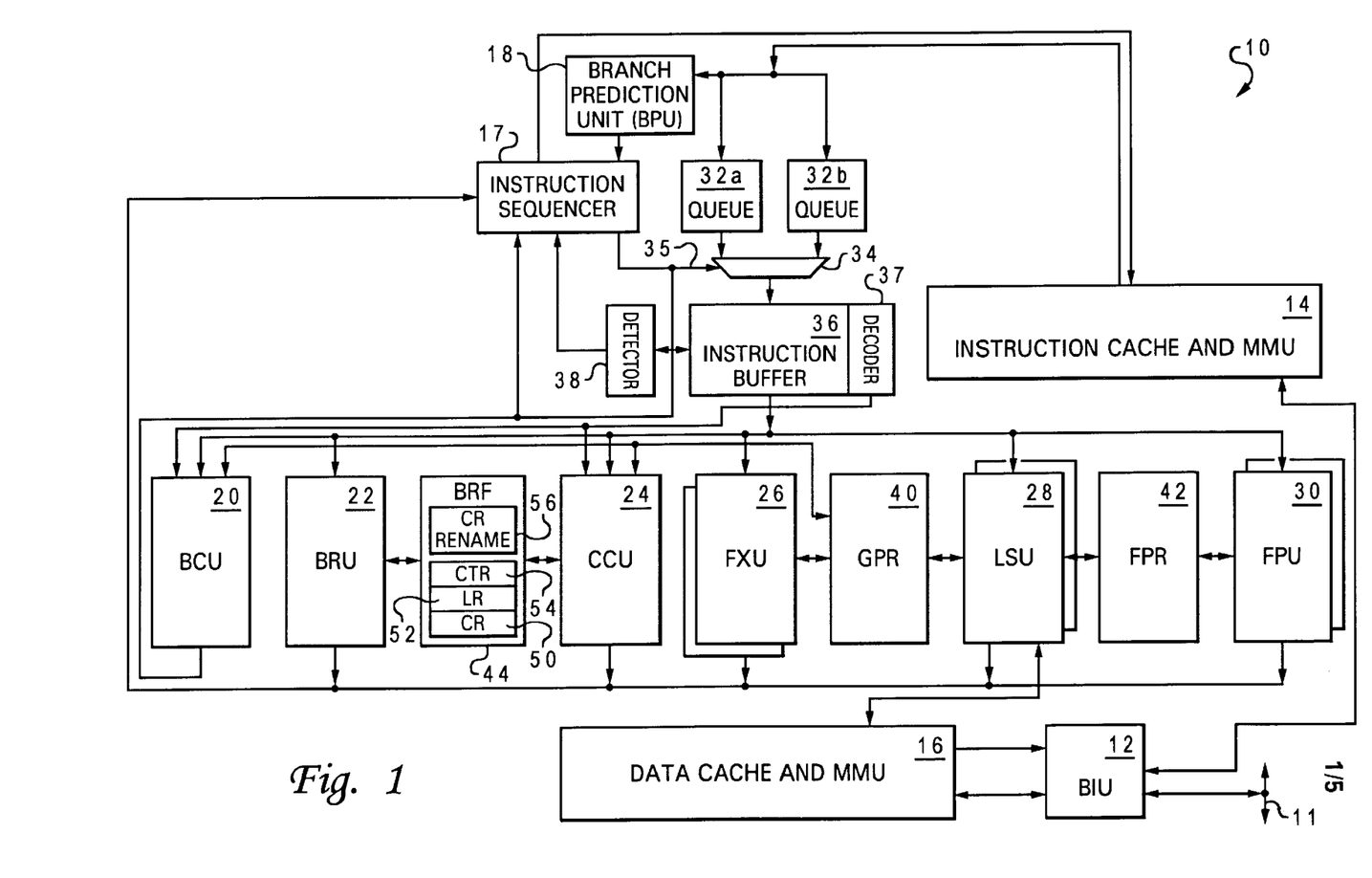
FIG. 1 depicts an illustrative embodiment of a data processing system with which the method and system of the present invention may advantageously be utilized.

With reference now to the figures and in particular with reference to FIG. 1, there is depicted a block diagram of an illustrative embodiment of a processor, indicated generally at 10, for processing information in accordance with the invention recited within the appended claims. In the depicted illustrative embodiment, processor 10 comprises a single integrated circuit superscalar microprocessor. Accordingly, as discussed further below, processor 10 includes various execution units, registers, buffers, memories, and other functional units, which are all formed by integrated circuitry. Processor 10 is preferably designed to execute instructions within the PowerPC™ Instruction Set Architecture (ISA); however, those skilled in the art will appreciate from the following description that the present invention can advantageously be applied to processors having different architectures, including both processors that employ branch prediction and processors that do not.

As illustrated in FIG. 1, processor 10 is coupled to bus 11 via a bus interface unit (BIU) 12 within processor 10. BIU 12 controls the transfer,of information between processor 10 and other devices coupled to bus 11, such as a memory (not illustrated), which together with processor 10 and bus 11 form a fully functional data processing system. BIU 12 is also connected to instruction cache 14 and data cache 116 within processor 10. High-speed caches, such as instruction cache 14 and data cache 16, enable processor 10 to achieve relatively fast access times to a subset of data or instructions previously transferred from memory to caches 14 and 16, thus improving the overall performance of the data processing system. Although only a single level of cache memory is illustrated, those skilled in the art will appreciate that processor 10 may include multiple levels of on-chip cache as is known in the art.

Processor 10 further includes an instruction sequencer 17, which controls the flow of instructions from instruction cache 14 to the execution units of processor 10, which in the illustrative embodiment include a branch condition unit (BCU) 20, a branch resolution unit (BRU) 22, a condition code unit (CCU) 24, one or more fixed-point units (FXUs) 26, one or more load-store units (LSUs) 28, and one or more floating-point units (FPUs) 30. Instruction sequencer 17 receives inputs from branch prediction unit (BPU) 18 indicating speculative fetch addresses, receives inputs from BRU 22 indicating correct path addresses that may be used to correct for branch misprediction, and receives inputs from all execution units indicating that execution of an instruction has finished. Based upon these inputs, instruction sequencer 17 supplies fetch addresses to instruction cache 14 in order to trigger fetching of cache lines of instructions.

Instruction cache 14 responds to the fetch addresses by loading instructions into queue 32$a$ or queue 32$b$, depending upon whether the fetch address corresponds 30 to the sequential execution path or a target (i.e., non-sequential or branch) execution path. That is, one of queues 32, for example, queue 32$a$, buffers instructions within the sequential execution path, and the other queue 32 buffers instructions within an alternative path, if any. BPU 18 also scans the fetched instructions for conditional branch instructions and predicts the direction (taken or not taken) of at least some conditional branch instructions to permit the generation of speculative fetch addresses, as noted above.

During normal execution, instructions within one of queues 32$a$ and 32$b$ are selected by selector 34 (in this case a multiplexer) for execution in response to two path select signals 35 generated by either instruction sequencer 17 or BCU 20, as described further below. Instructions within the selected path are permitted to flow from their queue 32 into an instruction buffer 36, from which the instructions can be dispatched as execution resources become available. While execution proceeds along the selected execution path, instructions within the alternative path remain buffered on "hot standby" by the other queue 32. In the event of branch misprediction, path select signals 35 are updated to reflect the correct execution path, and instructions in the alternative path are permitted to flow from their queue 32 into instruction buffer 36. Thus, maintaining instructions within the alternative path on "hot standby" reduces branch misprediction penalties since instructions within the alternative path have already been retrieved from instruction cache 14. Of course, if the conditional branch instruction defining the sequential and target execution paths is resolved by BRU 22 as correctly predicted, instructions within the not-taken path can be discarded in favor of new instructions fetched from instruction cache 14.

From instruction buffer 36, instructions are dispatched to the appropriate ones of execution units 22–30 in accordance with instruction classes detected by decoder 37. As is well-known to those skilled in the computer arts, each FXU 26, LSU 28, and FPU 30 executes one or more classes of instructions that perform operations which entail retrieving data from and/or storing data to general-purpose register (GPR) file 40 or floating-point register (FPR) file 42. Once an instruction has finished execution within one of execution units 26–30, the responsible execution unit notifies instruction sequencer 17, as noted above.

In accordance with a preferred embodiment of the present invention, conditional branch instructions that depend upon a condition register bit set by a preceding condition-setting instruction (such as compare or recording forms of add or subtract) are evaluated in an accelerated fashion by BCU 20 as taken or not taken, and all conditional branch instructions (including those subject to accelerated evaluation by BCU 20) are resolved by BRU 22 by reference to the values of a count register (CTR) 54, link register (LR) 52, and condition register (CR) 50 (or CR rename registers 56) within branch register file 44. As will become apparent from the description below, in alternative embodiments of the present invention, additional types of conditional branch instructions may also be evaluated in accelerated fashion by BCU 20, depending upon cycle time requirements.

Once BCU 20 evaluates a conditional branch instruction as taken or not taken, BCU 20 provides path select signals 35 indicative of the evaluation to selector 34 to control the operation of selector 34 in lieu of the control normally provided by instruction sequencer 17. Depending upon implementation, the output of BCU 20 may be imprecise (i.e., is possibly speculative), for example, because the condition-setting instruction is subject to speculative execution or because a detected conditional branch instruction depends upon an event other than the condition bit set by a preceding condition-setting instruction. In an imprecise implementation, BCU 20 only determines whether to switch execution paths (and purge instructions in the non-selected path), and BRU 22 verifies (i.e., finally resolves) all branch evaluations when the architected state becomes available. In an alternative embodiment, BCU 20 may also calculate a path address and supply it to instruction sequencer 17 for possible redirection of fetching in the event that the prediction made by branch prediction unit 18 is evaluated as incorrect.

In contrast to the imprecise operation of BCU 20, BRU 22 operates precisely to resolve conditional branch instructions by reference to the architected state contained in BRF 44. When BRU 22 resolves a conditional branch instruction, BRU 22 supplies the correct path address to instruction sequencer 17 for possible redirection of fetching in the event that the prediction made by branch prediction unit 18 was incorrect. In an alternative embodiment of the present invention in which BCU 20 is constrained to operate in a non-speculative (i.e., precise) manner and supports the resolution of conditional branches dependent upon the condition code bits produced by all condition-setting instructions, the functions of BRU 22 and BCU 20 may advantageously be merged, such that only a single BCU/BRU is implemented.

As described by Burns et al. in the patent applications incorporated by reference above, the content of CR 50 in BRF 44 is preferably updated by CCU 24, which directly executes signed and unsigned compare instructions and computes condition code bits for recording instructions processed by other execution units. As described by Burns et al., CCU 24 directly executes compare instructions to obtain the resulting LT, GT, and EQ condition code bits in a single cycle. CCU 24 also computes, in a single cycle, the LT, GT, and EQ condition code bits for recording instructions in parallel with the execution of the recording instructions by FXUs 22. In this manner, the conditions upon which certain conditional branch instructions depend are computed as early as possible, resulting in less speculation and quicker resolution of conditional branch instructions by BRU 22.

Figure 2:
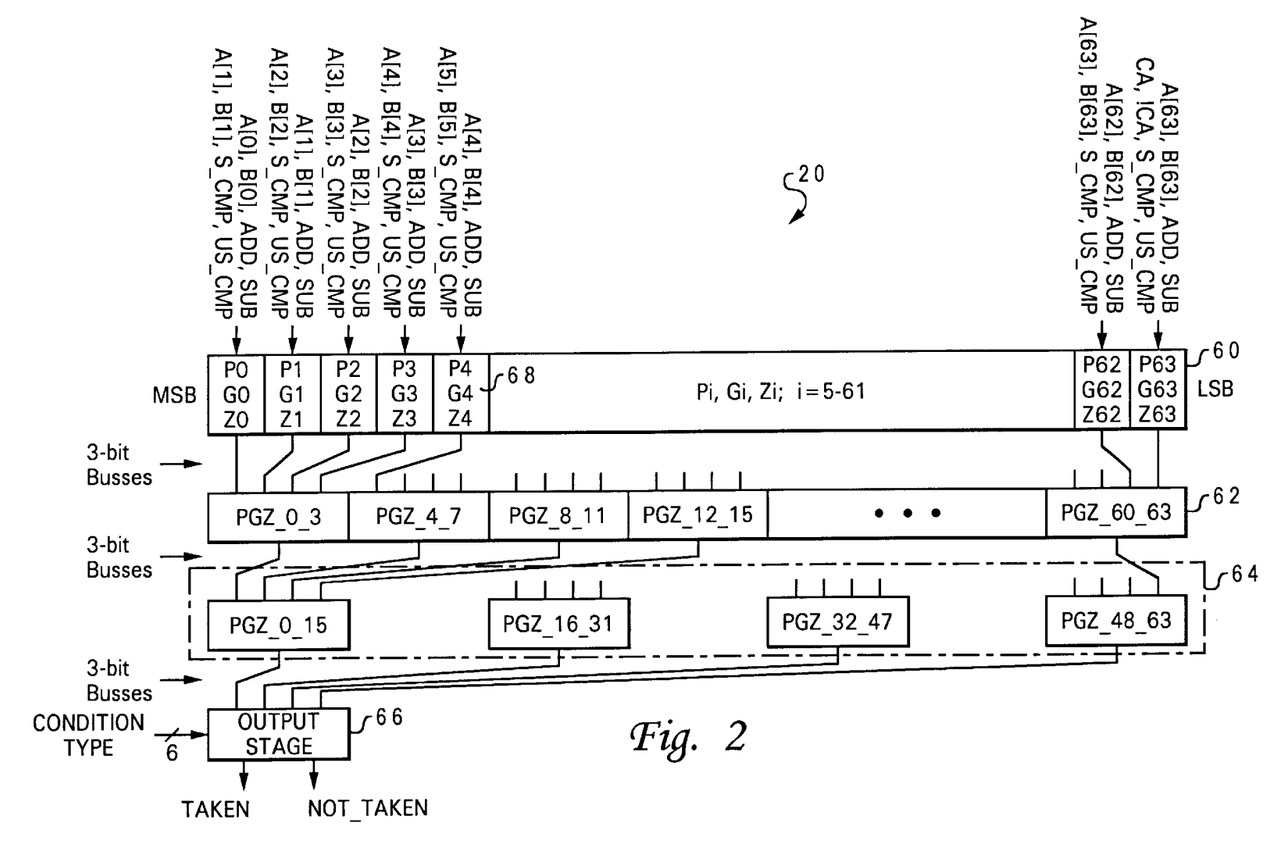
FIG. 2 is a block diagram of a preferred embodiment of the Branch Condition Unit (BCU) of the processor shown in FIG. 1.

Referring now to FIG. 2, there is depicted a more detailed block diagram of a preferred embodiment of BCU 20, which has a similar structure to CCU 24. As illustrated, BCU 20 includes a single computation stage 60, two merging stages 62 and 64, and an output stage 66. Computation stage 60 includes one combination element 68 for each operand bit position (e.g., 64 in the illustrated embodiment). The combination elements 68 for bit positions 0–62 each receive as inputs the bits of the corresponding and next less significant bit positions of operands A and B, as well as four control signals—addition (ADD), subtraction (SUB), signed compare (S_CMP), and unsigned compare (US_CMP)—generated by decoder 37 to indicate the type of condition-setting instruction upon which the conditional branch instruction depends. The combination element 68 for bit position 63 receives as inputs bit 63 of operands A and B, control signals, and the CA bit and its complement. Importantly, the CA bit is not a carry such as may be generated by the execution of an add instruction, but is instead a carry bit within an architecturally defined PowerPC® register. From these inputs, computation stage 60 computes propagate (P), generate (G), and kill (Z) outputs for each of bit positions 0–63 utilizing the following equations:

Propagate, generate, and kill outputs, bits 0:

$$P[0] = (((!A[0] \text{ or } !B[0]) \text{ and } ((A[0] \text{ xor } !B[0]) \text{ xor } (A[0+1] \text{ or } B[0+1]))) \text{ and ADD}) \text{ or}$$
$$(((A[0] \text{ or } !B[0]) \text{ and } ((A[0] \text{ xor } B[0]) \text{ xor } (!A[0+1] \text{ or } B[0+1]))) \text{ and SUB}) \text{ or}$$
$$(((A[0] \text{ or } !B[0]) \text{ and } ((A[0] \text{ xor } B[0]) \text{ xor } (!A[0+1] \text{ or } B[0+1]))) \text{ and S\_CMP}) \text{ or}$$
$$(((!A[0] \text{ or } B[0]) \text{ and } ((A[0] \text{ xor } B[0]) \text{ xor } (!A[0+1] \text{ or } B[0+1]))) \text{ and US\_CMP})$$

$$G[0] = (((!A[0] \text{ or } !B[0]) \text{ and } ((A[0] \text{ xor } !B[0]) \text{ and } (A[0+1] \text{ or } B[0+1]))) \text{ and ADD}) \text{ or}$$
$$(((A[0] \text{ or } !B[0]) \text{ and } ((A[0] \text{ xor } B[0]) \text{ and } (!A[0+1] \text{ or } B[0+1]))) \text{ and SUB}) \text{ or}$$
$$(((A[0] \text{ or } !B[0]) \text{ and } ((A[0] \text{ xor } B[0]) \text{ and } (!A[0+1] \text{ or } B[0+1]))) \text{ and S\_CMP}) \text{ or}$$
$$(((!A[0] \text{ or } B[0]) \text{ and } ((A[0] \text{ xor } B[0]) \text{ and } (!A[0+1] \text{ or } B[0+1]))) \text{ and US\_CMP})$$

$$Z[0] = (((A[0] \text{ and } B[0]) \text{ or } ((A[0] \text{ xor } B[0]) \text{ and } (!A[0+1] \text{ and } !B[0+1]))) \text{ and ADD}) \text{ or}$$
$$(((!A[0] \text{ and } B[0]) \text{ or } ((!A[0] \text{ xor } B[0]) \text{ and } (A[0+1] \text{ and } !B[0+1]))) \text{ and SUB}) \text{ or}$$
$$(((!A[0] \text{ and } B[0]) \text{ or } ((!A[0] \text{ xor } B[0]) \text{ and } (A[0+1] \text{ and } !B[0+1]))) \text{ and S\_CMP}) \text{ or}$$
$$(((A[0] \text{ and } !B[0]) \text{ or } ((!A[0] \text{ xor } B[0]) \text{ and } (A[0+1] \text{ and } !B[0+1]))) \text{ and US\_CMP})$$

Propagate, generate, and kill outputs, bits 1–62:

$$P[i] = (((A[i] \text{ xor } !B[i]) \text{ xor } (A[i+1] \text{ or } B[i+1])) \text{ and ADD}) \text{ or}$$
$$(((A[i] \text{ xor } B[i]) \text{ xor } (!A[i+1] \text{ or } B[i+1])) \text{ and SUB}) \text{ or}$$
$$(((A[i] \text{ xor } B[i]) \text{ xor } (!A[i+1] \text{ or } B[i+1])) \text{ and S\_CMP}) \text{ or}$$
$$(((A[i] \text{ xor } B[i]) \text{ xor } (!A[i+1] \text{ or } B[i+1])) \text{ and US\_CMP})$$

$$G[i] = (((A[i] \text{ xor } !B[i]) \text{ and } (A[i+1] \text{ or } B[i+1])) \text{ and ADD}) \text{ or}$$
$$((A[i] \text{ xor } B[i]) \text{ and } (!A[i+1] \text{ or } B[i+1])) \text{ and SUB}) \text{ or}$$
$$((A[i] \text{ xor } B[i]) \text{ and } (!A[i+1] \text{ or } B[i+1])) \text{ and S\_CMP}) \text{ or}$$
$$((A[i] \text{ xor } B[i]) \text{ and } (!A[i+1] \text{ or } B[i+1])) \text{ and US\_CMP})$$

$$Z[i] = ((A[i] \text{ xor } B[i]) \text{ and } (!A[i+1] \text{ and } !B[i+1]) \text{ and ADD}) \text{ or}$$
$$((A[i] \text{ xor } !B[i]) \text{ and } (A[i+1] \text{ and } !B[i+1]) \text{ and SUB}) \text{ or}$$
$$((A[i] \text{ xor } !B[i]) \text{ and } (A[i+1] \text{ and } !B[i+1]) \text{ and S\_CMP}) \text{ or}$$
$$((A[i] \text{ xor } !B[i]) \text{ and } (A[i+1] \text{ and } !B[i+1]) \text{ and US\_CMP})$$

Propagate, generate, and kill outputs, bit 63:

$$P[63] = (((A[63] \text{ xor } !B[63]) \text{ xor } CA) \text{ and ADD}) \text{ or}$$
$$(((A[63] \text{ xor } B[63]) \text{ xor } CA) \text{ and SUB}) \text{ or}$$
$$(((A[63] \text{ xor } B[63]) \text{ xor } CA) \text{ and S\_CMP}) \text{ or}$$
$$(((A[63] \text{ xor } B[63]) \text{ xor } CA) \text{ and US\_CMP})$$

-continued $G[63] = (((A[63] \text{ xor } !B[63]) \text{ and } CA) \text{ and } ADD)$ or
$\quad (((A[63] \text{ xor } B[63]) \text{ and } CA) \text{ and } SUB)$ or
$\quad (((A[63] \text{ xor } B[63]) \text{ and } CA) \text{ and } S\_CMP)$ or
$\quad (((A[63] \text{ xor } B[63]) \text{ and } CA) \text{ and } US\_CMP)$ $Z[63] = (((A[63] \text{ xor } B[63]) \text{ and } (!CA)) \text{ and } ADD)$ or
$\quad (((A[63] \text{ xor } !B[63]) \text{ and } (!CA)) \text{ and } SUB)$ or
$\quad (((A[63] \text{ xor } !B[63]) \text{ and } (!CA)) \text{ and } S\_CMP)$ or
$\quad (((A[63] \text{ xor } !B[63]) \text{ and } (!CA)) \text{ and } US\_CMP)$ The 64 sets of P, G, and Z signals produced by computation stage 60 are then passed to merging stage 62, which merges each group of four sets into a single set of P, G, and Z signals utilizing conventional merging circuitry, such as that commonly found in carry look-ahead adders (CLAs). Merging stage 64, which is constructed similarly to merging stage 62, merges the 16 sets of P, G, and Z signals output by merging stage 62 into four sets of P, G, and Z output signals, which form the inputs to output stage 66.

Output stage 66 then utilizes these inputs, which collectively represent the condition code bits upon which the conditional branch depends, and the branch condition type specified by the conditional branch instruction to evaluate Taken and Not_Taken signals comprising path input signals 35. The branch condition type upon which the conditional branch instruction depends is preferably provided to output stage 66 by decoder 37 as six signals utilizing the encodings set forth in Table I. It should be noted that the branch condition types need not be mutually exclusive.

TABLE I

| Branch Cond. | br_ if_ eq | br_ if_ gt | br_ if_ lt | not _br _if _eq | not _br _if _gt | not _br _if _lt |
|---|---|---|---|---|---|---|
| never | 0 | 0 | 0 | 1 | 1 | 1 |
| gt | 0 | 1 | 0 | 1 | 0 | 1 |
| lt | 0 | 0 | 1 | 1 | 1 | 0 |
| eq | 1 | 0 | 0 | 0 | 1 | 1 |
| ge | 1 | 1 | 0 | 0 | 0 | 1 |
| le | 1 | 0 | 1 | 0 | 1 | 0 |
| ne | 0 | 1 | 1 | 1 | 0 | 0 |
| always | 1 | 1 | 1 | 0 | 0 | 0 |

Figure 3A:
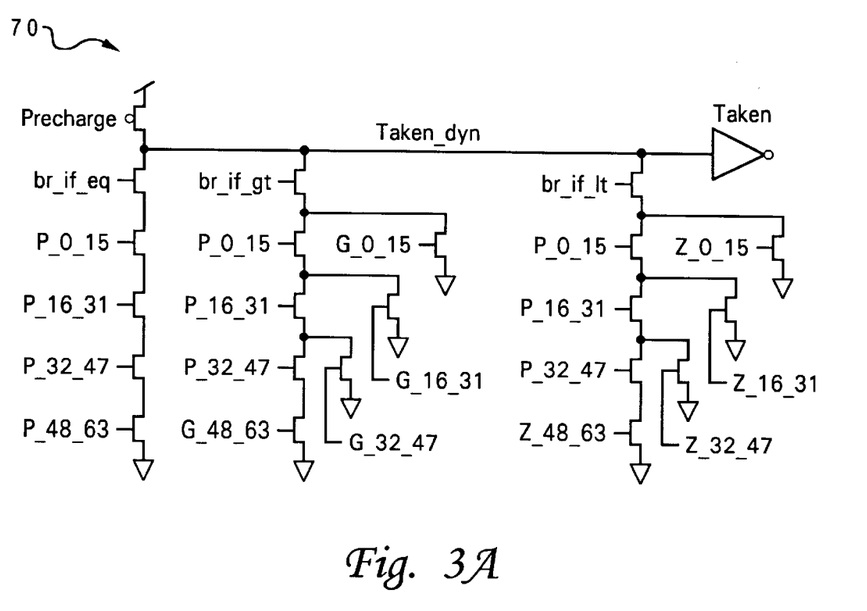
FIGS. 3A and 3B depict dynamic logic circuits utilized to implement the output stage depicted of the BCU illustrated in FIGS. 1 and 2.
Figure 3B:
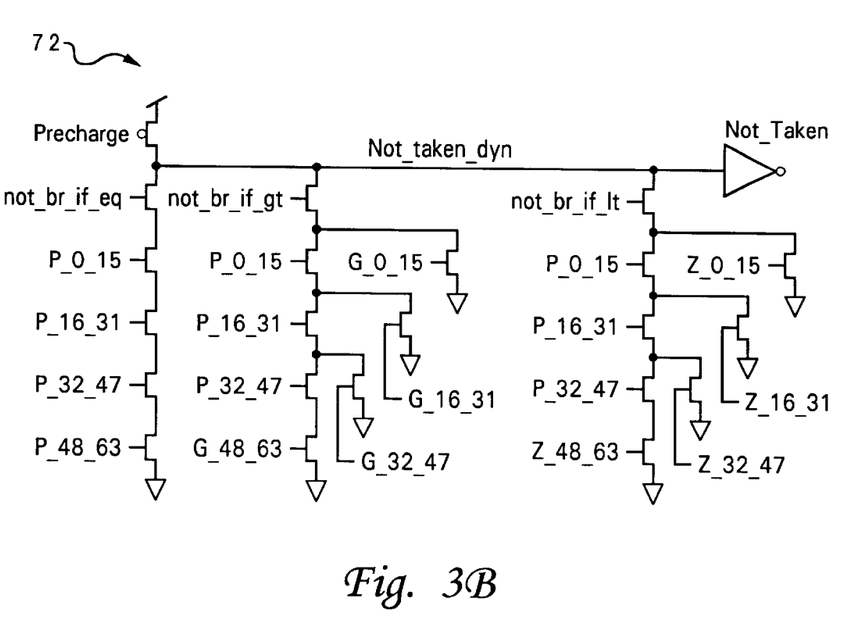

With reference now to FIGS. 3A and 3B, there are depicted detailed schematic diagrams of two exemplary dynamic logic circuits that together can be utilized to implement output stage 66. In contrast to the final merging stage disclosed by Burns et al., output stage 66 does not compute or output condition code bits as an intermediate step of branch resolution, but instead utilizes a single stage to directly evaluate Taken and Not_Taken signals.

Referring first to FIG. 3A, circuit 70 produces a Taken signal according to the following equation:

Taken=(br_if_eq and EQ) or (br_if_gt and GT) or (br_if_lt and LT), where br_if_eq, br_if_gt and br_if_lt are three branch condition signals provided by decoder 37 (as described above) and GT, LT, and EQ are condition code values. As illustrated, the Taken equation can be evaluated in a single cycle using a five-high transistor stack to evaluate each term, where:

EQ=P_0_15 and P_16_31 and P_32_47 and P_48_63;

GT=P_0_15 and P_16_31 and P_32_47 and G_48_63 or P_0_15 and P_16_31 and G_32_47 or P_0-15 and G_16_31 or G_0_15; and LT=P_0_15 and P_16_31 and P_32_47 and Z_48_63 or P_0_15 and P_16_31 and Z_32_47 or P_0_15 and Z_16_31 or Z_0_15.

Similarly, by inspection of FIG. 3B, it can be seen that circuit 72 concurrently produces a Not_Taken signal according to the equation:

Not_Taken=(not_br_if_eq and EQ) or (not_br_if_gt and GT) or (not_br_if_lt and LT).

The Taken and Not_Taken signals generated by output stage 66 of BCU 20 are then routed to selector 34 as path select signals 35. In an alternative embodiment, a Taken/Not_Taken indication can be routed only to instruction sequencing unit 17, which can in turn update path select signals 35 as appropriate.

Referring now to FIGS. 4A–4D, there are depicted four partial block diagrams of processor 10 that together illustrate an exemplary operating scenario in which a conditional branch instruction that depends upon a condition produced by a condition-setting instruction (e.g., a compare instruction) is resolved in accordance with the present invention. For simplicity, FIGS. 4A–4D represent four consecutive cycles of processor operation in which one instruction is dispatched each cycle. Those skilled in the art will appreciate that for superscalar operation other non-interfering instructions may also be issued concurrently with the condition-setting (e.g., compare) and conditional branch instructions described below.

Figure 4A:
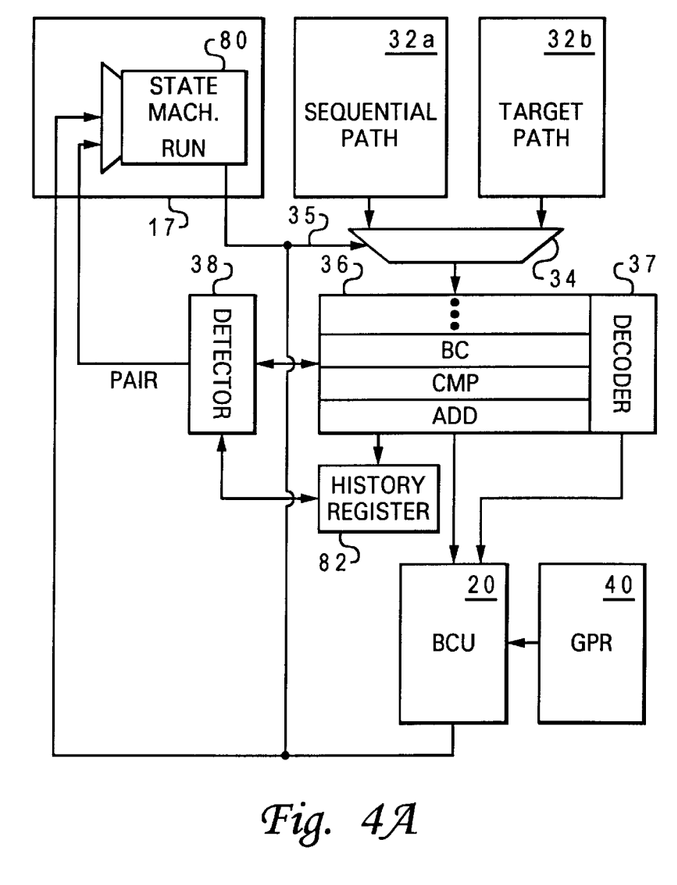
FIGS. 4A–4D illustrate an exemplary operating scenario in which the resolution of a conditional branch instruction that depends upon a condition produced by a compare instruction is accelerated in accordance with the present invention.

Referring first to FIG. 4A, at the beginning of the first cycle, instruction buffer 36, which has at least three entries in the depicted embodiment, contains a non-condition-setting addition (ADD) instruction, which is the oldest instruction yet to be dispatched, a compare instruction (CMP) (i.e., a condition-setting instruction), and a conditional branch instruction (BC) that depends upon the condition code bits that are to be generated by the compare instruction. In addition, state machine 80 within instruction sequencer 17 is in RUN state, meaning that state machine 80 is responsible for generating path select signals 35, which currently select instructions from the sequential execution path contained within queue 32a.

During the first cycle, the ADD instruction is dispatched from instruction buffer 36 to FXU 26 (see FIG. 1), and a detector 38 detects a combination of a condition-setting instruction and a branch conditional instruction. Detector 38 can detect this combination of instructions in two ways. First, detector 38 can detect a condition-setting instruction preceding a branch conditional instruction within instruction buffer 36. Alternatively, if no condition-setting instruction precedes the branch conditional instruction in instruction buffer 36, detector 38 can detect a combination of a branch conditional instruction and the most recently dispatched condition-setting instruction, which is maintained in history register 82. Thus, any number of intervening non-condition-setting instructions may appear between the condition-setting instruction and the conditional branch instruction. In response to the detection of either type of combination of instructions, detector 38 provides a PAIR signal to state machine 80. The PAIR signal is a request for control of execution path selection that, if accepted, means that in two cycles BCU 20 will be responsible for providing path select signals 35 instead of state machine 80.

Figure 4B:
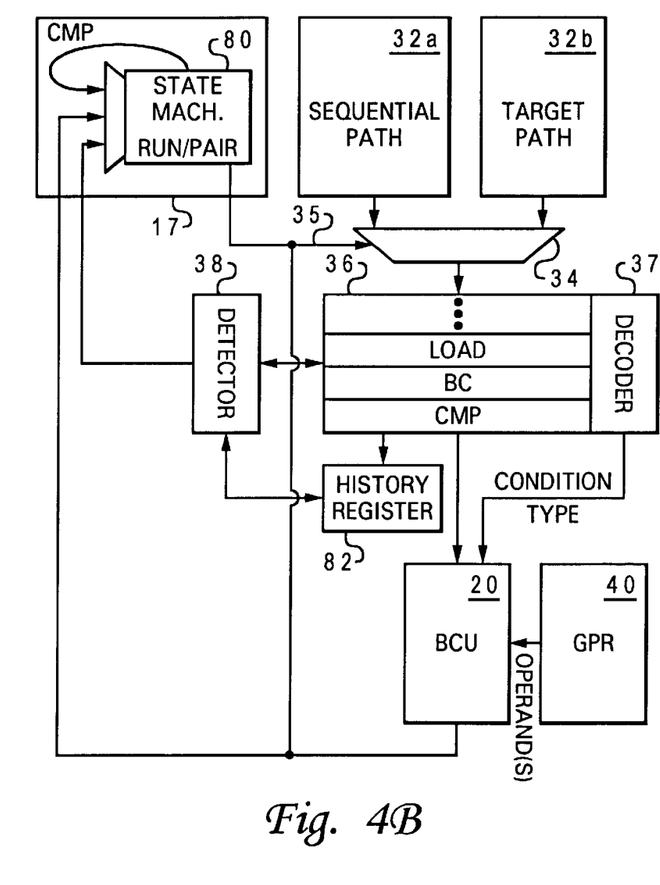

As shown in FIG. 4B, at the beginning of the second cycle, the compare instruction is now the oldest instruction within instruction buffer 36, and state machine 80 has progressed to a transitional RUN/PAIR state in response to the PAIR input received from detector 38. Selector 34 is still directed by the path select signals 35 output by state machine 80 to transfer instructions from one of queues 32a and 32b to instruction buffer 36.

During the second cycle, instruction buffer 36 dispatches the compare instruction to BCU 20 and CCU 24, and GPR file 40 outputs one or more operands specified by the compare instruction to BCU 20 in response to an enable signal (not illustrated) from state machine 80. To permit processing of historical instructions in history register 82 together with current conditional branch instructions, these operands are held by BCU 20 until the next condition-setting instruction is received. Also during the second cycle, decoder 37 decodes the conditional branch instruction to produce the six decoded condition type signals, and state machine 80 generates a CMP signal indicating that BCU 20 will operate selector 34 during the next cycle.

Figure 4C:
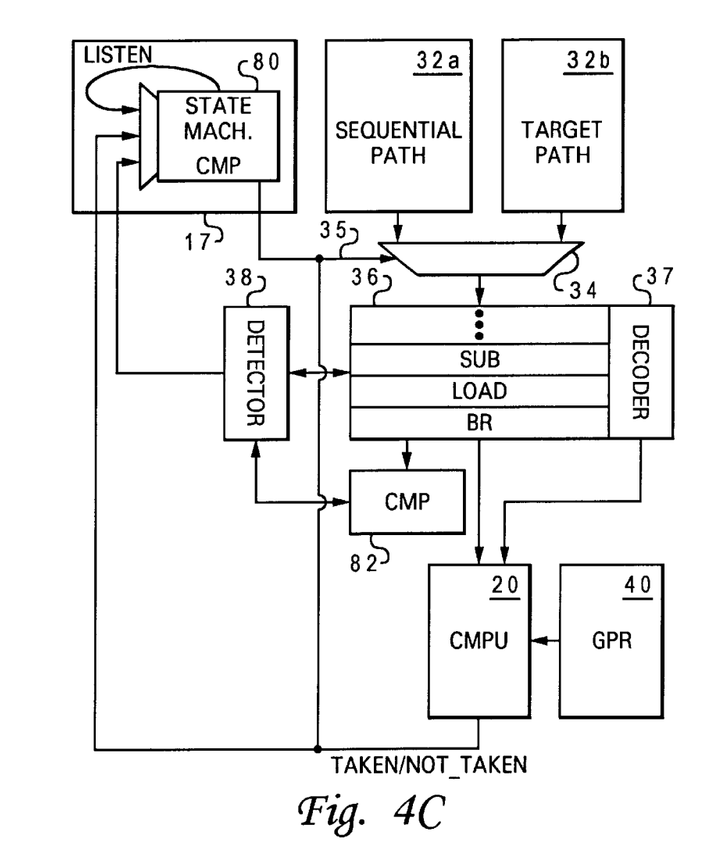

With reference now to FIG. 4C, at the beginning of the third cycle, the conditional branch instruction is the oldest instruction within instruction buffer 36. By this time, BPU 18 has provided a speculative fetch address to instruction cache 14 based upon the conditional branch instruction, thereby causing instruction cache 14 to load instructions within a target path into queue 32b. The instructions (e.g., LOAD, SUB) that have been loaded into instruction buffer 36 under the direction of state machine 80 following the conditional branch may be from the sequential path (i.e., queue 32a) or the target path (i.e., queue 32b). As indicated, at the beginning of cycle 3, state machine 80 is in the CMP state, meaning that state machine 80 will not assert path select signals 35 this cycle.

During cycle 3, the conditional branch instruction is dispatched from instruction buffer 36 to BRU 22, and BCU 20 evaluates the decoded branch condition type and the compare instruction in a single operation, as described above. The evaluation, which is indicated by the Taken and Not_Taken signals output by output stage 66, supplies the path select signals 35 that control the operation of selector 34. Thus, if the conditional branch instruction is evaluated as Not_Taken, instructions within queue 32a are selected for execution by selector 34. Conversely, if the conditional branch instruction is evaluated as Taken, the path select signals 35 output by BCU 20 cause selector 34 to fill instruction buffer 36 with instructions in the target execution path from queue 32b. Also during cycle 3, state machine 80 generates a LISTEN signal that triggers a state transition to the LISTEN state.

Figure 4D:
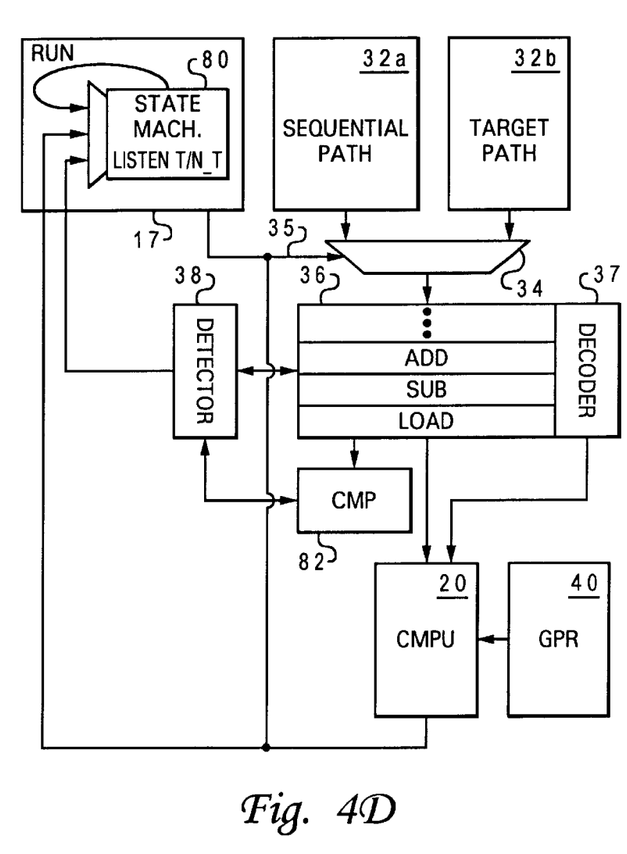

With reference to FIG. 4D, during cycle 4 state machine resumes control of selector 35 by outputting path select signals 35 matching those generated by BCU 20 (to continue execution down the selected path) and a RUN signal that will cause state machine 80 to return from the LISTEN state to its original RUN state. As indicated, state machine 80 also retains an indication of the evaluation provided by BCU 20 in order to perform any cleanup operations necessitated by the path selection of BCU 20. In particular, while in the LISTEN state, state machine 80 preferably moves target path instructions within queue 32b into queue 32a if BCU 20 asserted the Taken signal and deasserted the Not_Taken signal. In this case, the sequential path instructions within queue 32a are preferably moved into queue 32b to permit fast recovery in the event that BRU 22 ultimately resolves the conditional branch instruction as not-taken.

As has been described, the present invention provides an improved processor and method for evaluating branch instructions by directly evaluating a conditional branch instruction and a condition-setting instruction in a single operation. As indicated above, by merging these formerly sequential operations into a single operation rather than computing and storing condition code bits as an intermediate step, conditional branch resolution is accelerated.

While the invention has been particularly shown and described with reference to a preferred embodiment, it will be understood by those skilled in the art that various changes in form and detail may be made therein without departing from the spirit and scope of the invention. For example, the execution unit utilized to jointly evaluating the condition-setting instruction and conditional branch instruction may be modified to handle additional types of arithmetic and logical condition-setting instructions. The execution unit, and in particular, the circuits shown in FIGS. 3A and 3B can also be modified to also generate the condition code bits, thus eliminating the need for a stand alone CCU. In addition, those skilled in the art will recognize that different encodings of the condition types may be utilized, as well as different condition code bits (e.g., the x86 carry, sign, zero, overflow, and parity condition bits). Further, a person skilled in the art will appreciate that the embodiment of the present invention disclosed herein may be readily adapted to permit processing of single operand recording instructions or to implement the functions described herein utilizing various families of integrated circuitry. Also, the present invention is not limited to processors employing a particular type of branch prediction, but is specifically contemplated for use in processors that utilize all varieties of branch prediction as well as processors that do not implement branch prediction.

What is claimed is:

1. A processor, comprising:
   an instruction sequencer that fetches a plurality of instructions;
   a detector that detects, among said plurality of fetched instructions, a condition-setting instruction and a conditional branch instruction that depends upon said condition-setting instruction;
   a decoder that decodes said conditional branch instruction to produce a decoded condition type; and
   an execution unit that, responsive to said detection, resolves said conditional branch instruction by evaluating said condition-setting instruction and decoded condition type in a single operation.

2. The processor of claim 1, and further comprising branch prediction circuitry that, responsive to said conditional branch instruction, predicts a speculative execution path, wherein said instruction sequencer fetches instructions within said speculative execution path in response to a prediction.

3. The processor of claim 1, and further comprising instruction storage in which fetched instructions are stored prior to execution, wherein said instruction storage includes a selector, responsive to an indication of said resolution from said execution unit, that selects instructions within a current execution path or instructions within an alternative execution path for execution.

4. The processor of claim 1, wherein said detector detects only a subset of combinations of condition-setting and conditional branch instructions.

5. The processor of claim 1, wherein said processor further comprises operand storage that contains at least one operand of said condition-setting instruction and supplies said at least one operand to said execution unit.

6. The processor of claim 1, wherein said execution unit further comprises:
   a condition computation stage that logically combines bit values of one or more operands to produce propagate, generate and kill signals that collectively indicate values for a plurality of condition code bits; and
   an output stage that logically combines said propagate, generate, and kill signals with said decoded condition type to resolve said conditional branch instruction.

7. The processor of claim 6, wherein said condition computation stage comprises:
   a single computation stage containing M combination elements that each receive as inputs individual bit values of a respective bit position within first and said second operands, wherein each of said M combination elements of said single computation stage logically combines said individual bit values and outputs each of propagate, generate and kill signals for its respective one of said M bit positions, wherein propagate, generate and kill signals for all of said M bit positions collectively indicate values for said plurality of condition code bits.

8. The processor of claim 6, said execution unit further comprising at least one merging stage, coupled between said condition computation stage and said output stage, that reduces a number of signals that collectively indicate values for said plurality of condition code bits.

9. The processor of claim 1, wherein said execution unit resolves all conditional branch instructions.

10. A method of resolving a conditional branch instruction within a processor, said method comprising:
    fetching a plurality of instructions;
    detecting, among said plurality of fetched instructions, a condition-setting instruction and a conditional branch instruction that depends upon said condition-setting instruction;
    decoding said conditional branch instruction to produce a decoded condition type; and
    in response to said detection, resolving said conditional branch instruction by evaluating said condition-setting instruction and decoded condition type in a single operation.

11. The method of claim 10, and further comprising:
    in response to said conditional branch instruction, predicting a speculative execution path; and
    in response to said prediction, speculatively fetching instructions within said speculative execution path.

12. The method of claim 10, and further comprising:
    temporarily storing fetched instructions in instruction storage prior to execution;
    in response to an indication of said resolution, selecting, from said instruction storage, instructions within a current execution path or instructions within an alternative execution path for execution.

13. The method of claim 10, wherein said detecting comprises detecting only a subset of combinations of condition-setting and conditional branch instructions.

14. The method of claim 10, and further comprising:
    storing at least one operand of said condition-setting instruction in operand storage; and
    supplying said at least one operand to said execution unit to perform said single operation.

15. The method of claim 10, wherein resolving said conditional branch instruction comprises:
    in a condition computation stage, logically combining bit values of one or more operands to produce propagate, generate and kill signals that collectively indicate values for a plurality of condition code bits; and
    in an output stage, logically combining said propagate, generate, and kill signals with said decoded condition type to produce a resolution of said conditional branch instruction.

16. The method of claim 15, wherein said step of logically combining bit values to produce propagate, generate, and kill signals comprises:
    in a single computation stage containing M combination elements, receiving as inputs to each combination element individual bit values of a respective bit position within first and said second operands; and
    in each of said M combination elements of said single computation stage, logically combining said individual bit values to produce each of propagate, generate and kill signals for a respective one of said M bit positions, wherein propagate, generate and kill signals for all of said M bit positions collectively indicate values for said plurality of condition code bits.

17. The method of claim 15, and further comprising reducing a number of signals that collectively indicate values for said plurality of condition code bits utilizing at least one merging stage coupled between said condition computation stage and said output stage.

* * * * *